(12) United States Patent
Tipton et al.

(10) Patent No.: US 12,487,264 B2
(45) Date of Patent: Dec. 2, 2025

(54) SIGNAL PROCESSING CIRCUIT AND MEASUREMENT SYSTEM

(71) Applicant: Rohde & Schwarz GmbH & Co. KG, Munich (DE)

(72) Inventors: Darren Tipton, Munich (DE); Wolfgang Wendler, Munich (DE); Florian Ramian, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 154 days.

(21) Appl. No.: 18/489,515

(22) Filed: Oct. 18, 2023

(65) Prior Publication Data

US 2025/0130263 A1    Apr. 24, 2025

(51) Int. Cl.
G01R 29/26 (2006.01)
(52) U.S. Cl.
CPC .................. G01R 29/26 (2013.01)
(58) Field of Classification Search
CPC .............................. G01R 29/26; G01R 23/16
USPC .................. 324/614, 613, 612, 600
See application file for complete search history.

(56) References Cited

U.S. PATENT DOCUMENTS

| | | | | |
|---|---|---|---|---|
| 12,025,638 | B1* | 7/2024 | Gines | G01R 29/26 |
| 2016/0273957 | A1* | 9/2016 | Bendele | G01H 1/003 |
| 2019/0123753 | A1* | 4/2019 | Straussnigg | H03M 1/201 |
| 2020/0309831 | A1* | 10/2020 | Erickson | H04B 17/318 |
| 2022/0077869 | A1* | 3/2022 | Chae | H03M 1/0626 |
| 2023/0003782 | A1 | 1/2023 | Iwai | |
| 2024/0110963 | A1* | 4/2024 | Mohindra | G01R 29/26 |

* cited by examiner

Primary Examiner — Giovanni Astacio-Oquendo
(74) Attorney, Agent, or Firm — CHRISTENSEN O'CONNOR JOHNSON KINDNESS PLLC

(57) ABSTRACT

A signal processing circuit for a measurement instrument is described. The signal processing circuit comprises a measurement input, a first measurement channel, a second measurement channel, and a noise canceling circuit. The first measurement channel comprises a first wideband analog-to-digital converter (ADC) and a first transformation circuit. An output signal of the first measurement channel is a first frequency domain signal. An output signal of the second measurement channel is a second frequency domain signal. The first frequency domain signal and the second frequency domain signal are a complex-valued signal, respectively. The noise canceling circuit is configured to receive the first frequency domain signal and the second frequency domain signal and to determine a combined average of the first frequency domain signal and of the second frequency domain signal over a predetermined number of frequency bins, thereby obtaining a complex-valued average signal. Further, a measurement system is described.

17 Claims, 2 Drawing Sheets

SIGNAL PROCESSING CIRCUIT AND MEASUREMENT SYSTEM

FIELD OF THE DISCLOSURE

Embodiments of the present disclosure generally relate to a signal processing circuit for a measurement instrument. Embodiments of the present disclosure further relate to a measurement system.

BACKGROUND

An important figure of merit for the performance of an electronic device under test is the noise figure of the device under test, i.e. the noise generated by the device under test measured over a certain frequency band.

Different techniques to obtain the noise figure of an electronic device under test are known in the art, inter alia the so-called Y-factor method and the so-called cold-source method.

In general, it is desirable to reduce the measurement time necessary for determining the noise figure. Moreover, it is desirable to improve the accuracy of the determined noise figure.

Thus, there is a need for a signal processing circuit and a measurement system that allow for testing devices under test in a time-efficient and accurate manner.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a signal processing circuit for a measurement instrument. In some embodiments, the signal processing circuit comprises a measurement input, a first measurement channel, a second measurement channel, and a noise canceling circuit. The first measurement channel and the second measurement channel are arranged in parallel. The first measurement channel and the second measurement channels are each connected to the measurement input such that an input signal received via the measurement input is forwarded to the first measurement channel and to the second measurement channel, respectively.

In an embodiment, the first measurement channel comprises a first wideband analog-to-digital converter (ADC) and a first transformation circuit. The first wideband ADC is configured to digitize a signal processed by the first measurement channel, thereby obtaining a first digitized signal. The first transformation circuit is configured to transform the first digitized signal or a processed version of the first digitized signal into frequency domain such that an output signal of the first measurement channel is a first frequency domain signal.

Additionally or alternatively, the second measurement channel comprises a second wideband ADC and a second transformation circuit. The second wideband ADC is configured to digitize a signal processed by the second measurement channel, thereby obtaining a second digitized signal. The second transformation circuit is configured to transform the second digitized signal or a processed version of the second digitized signal into frequency domain such that an output signal of the second measurement channel is a second frequency domain signal.

In an embodiment, the first frequency domain signal and the second frequency domain signal are a complex-valued signal, respectively.

In some embodiments of the signal processing circuit, the noise canceling circuit is configured to receive the first frequency domain signal and the second frequency domain signal and to determine a combined average of the first frequency domain signal and of the second frequency domain signal over a predetermined number of frequency bins, thereby obtaining a complex-valued average signal.

The first frequency domain signal and the second frequency domain signal both are associated with the same input signal received from a device under test.

The signal processing circuit according to embodiments of the present disclosure is based on the idea to use a wideband ADC in the measurement channels, respectively. The wideband ADCs allow for converting the complete relevant bandwidth of the input signal into the digital domain simultaneously, such that the complete relevant frequency band can be processed downstream of the ADCs simultaneously by converting the respective signals into the frequency domain.

In the state of the art, only a narrow band of approximately 1 to 5 MHz is converted into the digital domain and processed simultaneously. The relevant frequency spectrum of the input signal is sampled and processed iteratively in step sizes of about 1 to 5 MHz. Thus, a plurality of measurement steps are necessary in order to cover the complete relevant spectrum.

As the signal processing circuit according to the present disclosure allows for processing the complete relevant frequency spectrum simultaneously, the time necessary for performing measurements on a device under test is reduced significantly.

Both the first frequency domain signal and the second frequency domain signal comprise noise, namely phase noise and amplitude noise, originating from the device under test, such that these portions of the frequency domain signals are correlated with each other and do not cancel out when performing the combined average.

On the other hand, noise originating in the parallel measurement channels processing the input signal in parallel is not correlated with each other and at least partially cancels out when performing the combined average.

Accordingly, noise originating in the parallel measurement channels is suppressed in the complex-valued average signal, which allows for determining the noise figure of the device under test with enhanced precision as noise originating in the signal processing circuit is suppressed.

According to an aspect of the present disclosure, a bandwidth of the wideband ADCs is, for example, equal to or larger than 20 MHz. In some embodiments, the bandwidth of the wideband ADCs is equal to or larger than 50 MHz, 100 MHz, or 150 MHz.

According to another aspect of the present disclosure, a bandwidth of the wideband ADCs is, for example, equal to or larger than 250 MHz. In some embodiments, the bandwidth of the wideband ADCs is equal to or larger than 500 MHZ, 1 GHZ, or 1.5 GHZ.

A further aspect of the present disclosure provides that a bandwidth of the wideband ADCs is, for example, equal to or larger than 2.5 GHZ. In some embodiments, the bandwidth of the wideband ADCs is equal to or larger than 5 GHZ, 10 GHZ, 15 GHZ, or 50 GHz.

In an embodiment of the present disclosure, the noise canceling circuit is configured to determine an absolute value of the complex-valued average signal, thereby obtaining an output signal. The absolute value of the complex-valued average signal is a measure for the power of the wanted signal (also called "useful signal") of the device under test (including the noise contribution of the device under test), as other noise contributions cancel partially or completely due to the combined average performed.

In a further embodiment of the present disclosure, the noise canceling circuit is configured to determine a real part of the complex-valued average signal, thereby obtaining an output signal. It has turned out that the real part of the complex-valued average signal is also an appropriate measure for the power of the wanted signal of the device under test (including the noise contribution of the device under test), for example if the predetermined number of frequency bins is large. However, using the real part may not be appropriate in some circumstances, e.g. if the real part is negative.

According to an aspect of the present disclosure, the predetermined number of frequency bins, for example, is adjustable. In general, the resolution of the complex-valued average signal in frequency domain can be adapted by adapting the predetermined number of frequency bins.

In some embodiments, the first measurement channel and the second measurement channel are functionally identical. In other words, the two parallel measurement channels are identically constructed, i.e. they comprise identically constructed electronic components. Thus, the two parallel measurement channels process the input signal received from the device under test in the same way. However, noise originating in the first measurement channel is not correlated with noise originating in the second measurement channel, and thus cancels when performing the combined average of the frequency domain signals.

In some embodiments, the first measurement channel and the second measurement channel may be synchronized. In other words, the same portions of the input signal are processed by the two parallel measurement channels simultaneously, such that the frequency domain signals correspond to the same time-domain portion of the input signal. This ensures that the wanted signal (also called "useful signal") including the noise generated by the device under test does not cancel when performing the combined average.

In an embodiment of the present disclosure, the signal processing circuit further comprises a visualization circuit. In some embodiments, the visualization circuit is configured to generate visualization data associated with the complex-valued average signal. The visualization data may be displayed on a display. Accordingly, information with respect to the complex-valued average signal (and thus information regarding the noise figure of the device under test) is presented to a user in an illustrative way.

In a further embodiment of the present disclosure, the first transformation circuit and the second transformation circuit are each configured to perform a fast Fourier transform. Thus, the respective signals are transformed into frequency domain in a particularly efficient manner.

According to another aspect of the present disclosure, the first measurement channel comprises, for example, a first mixer circuit configured to receive a first local oscillator signal, wherein the second measurement channel comprises a second mixer circuit configured to receive a second local oscillator signal, and wherein the first local oscillator signal and the second local oscillator signal have the same frequency. In general, the first mixer circuit is configured to down-convert the input signal processed by the first measurement channel to an intermediate frequency being suitable for processing by the electronic components downstream of the first mixer circuit. Likewise, the second mixer circuit is configured to down-convert the input signal processed by the second measurement channel to an intermediate frequency being suitable for processing by the electronic components downstream of the second mixer circuit.

As the first local oscillator signal and the second local oscillator signal have the same frequency, the signals processed by the parallel measurement channels are converted to the same intermediate frequency.

Embodiments of the present disclosure further provide a measurement system. In an embodiment, the measurement system comprises a signal processing circuit described above, a device under test, and an analysis circuit. An output of the device under test is connected to the measurement input of the signal processing circuit. The analysis circuit is configured to determine a noise figure of the device under test based on an output signal of the signal processing circuit.

In some embodiments, the measurement system comprises a signal processing circuit according to any one of the embodiments described above.

Regarding the advantages and further properties of the measurement system, reference is made to the explanations given above with respect to the signal processing circuit, which also hold for the measurement system and vice versa.

In an embodiment of the present disclosure, the measurement system further comprises a calibrated noise source, wherein the calibrated noise source is connected to an input of the device under test. In general, the calibrated noise source is configured to generate a noise signal having a known enhanced noise ratio, i.e. a noise level that is a known multiple of the thermal noise. For example, the calibrated noise source may be a noise diode, wherein a predetermined voltage is applied to the noise diode.

According to an aspect of the present disclosure, the measurement system, for example, is configured to determine the noise figure of the device under test by a Y-factor method. Accordingly, the complex-valued average signal is determined two times, namely once with the calibrated noise source being activated and once with the calibrated noise source being deactivated. Based on the two measurements, the actual noise figure of the device under test can be determined based on the complex-valued average signals obtained in the two measurements.

In a further embodiment of the present disclosure, the measurement system further comprises a termination load. In some embodiments, the termination load is connected to an input of the device under test. The termination load may have an impedance that is suitable for the respective device under test, e.g. between 25 and 75 Ohm, such that a matched condition is obtained.

According to another aspect of the present disclosure, the measurement system, for example, is configured to determine the noise figure of the device under test by a cold-source method. Accordingly, the complex-valued average signal is determined with the termination load attached to the input of the device under test. The noise figure of the device under test is determined based on the complex-valued average signal and based on a gain of the device under test.

In some embodiments, the gain of the device under test may have been determined in a previous calibration step, for example in a measurement of a S21-parameter of the device under test.

In some embodiments, the measurement system further comprises a power meter that is provided downstream of the device under test and upstream of the measurement input. In general, the power meter is configured to determine a power of an output signal of the device under test.

In some embodiments, the analysis circuit may be configured to determine the gain of the device under test based on the determined power of the output signal of the device under test.

A further aspect of the present disclosure provides that the signal processing circuit and the analysis circuit, for example, are integrated into a measurement instrument. In general, the measurement instrument is configured to perform measurements on the device under test, namely measurements of the noise figure of the device under test.

In some embodiments, the measurement instrument is a signal analyzer, a spectrum analyzer, a noise figure meter, a vector network analyzer, or an oscilloscope.

However, it is to be understood that the measurement instrument may be any other suitable type of measurement instrument.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
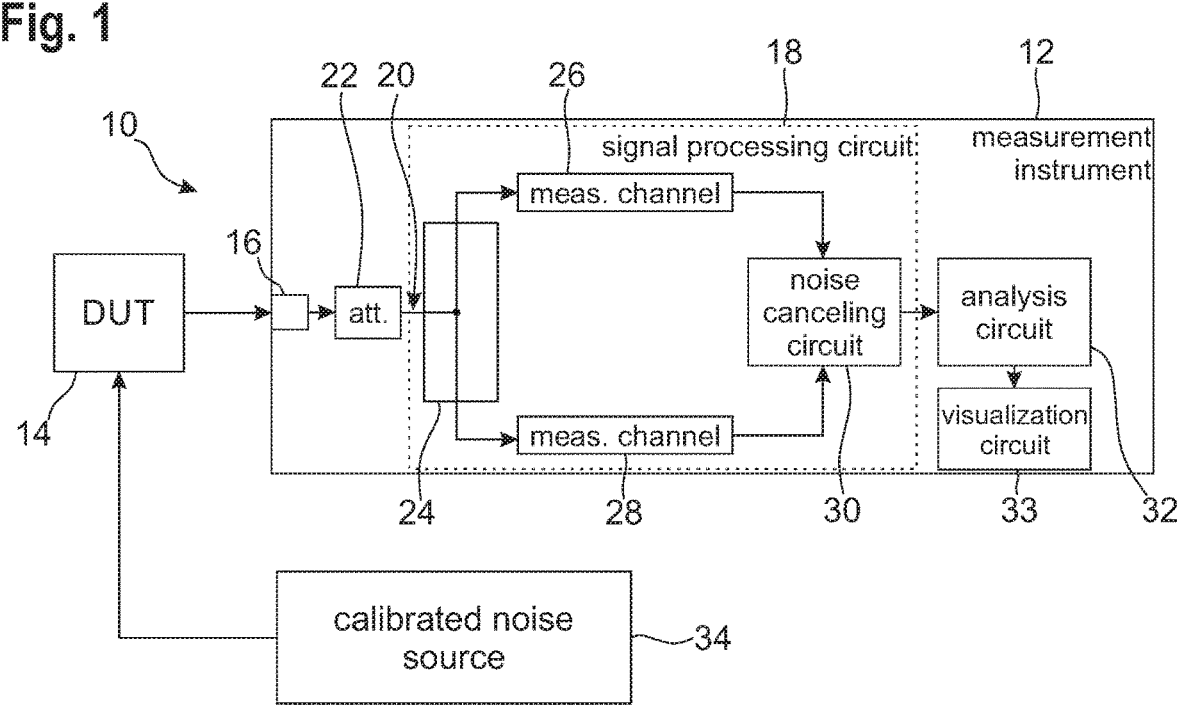
FIG. 1 schematically shows a measurement system according to an embodiment of the present disclosure.

FIG. 1 schematically shows a measurement system 10 comprising a measurement instrument 12 and a device under test 14 in accordance with an embodiment of the disclosure. In general, the measurement instrument 12 is configured to analyze an input signal received from the device under test 14 in order to analyze certain properties of the device under test 14, for example a noise figure of the device under test 14.

In some embodiments, the measurement instrument 12 is a signal analyzer, a spectrum analyzer, a noise figure meter, a vector network analyzer, or an oscilloscope. However, it is to be understood that the measurement instrument 12 may be any other suitable type of measurement instrument.

The device under test 14 is connected with the measurement instrument 12. In some embodiments, the device under test 14 may be established as any electronic device that is configured to process a radio-frequency (RF) signal. For example, the device under test 14 comprises one or several electronic circuits processing an RF signal, wherein the performance of the electronic circuit(s) is assessed by the measurement instrument 12. In some embodiments, the device under test 14 may be established as an amplifier, a filter, a mixer, or as any other electronic two-port device.

In some embodiments, an output of the device under test 14 is connected to a signal input 16 of the measurement instrument 12 such that an electric signal output by the device under test 14 is transmitted from the device under test 14 to the measurement instrument 12, for example via cable.

In the embodiment shown, the measurement instrument 12 comprises a signal processing circuit 18 having a measurement input 20 that is connected to the signal input 16, optionally via an attenuator 22. The signal processing circuit 18 comprises, for example, a splitter circuit 24, a first measurement channel 26 connected to the splitter circuit 24, a second measurement channel 28 connected to the splitter circuit 24, and a noise canceling circuit 30 being connected to the measurement channels 26, 28.

The structure and functionality of the signal processing circuit 18 will be described in more detail below.

In some embodiments, the measurement instrument 12 further comprises an analysis circuit 32 being connected to the noise canceling circuit 30. The measurement instrument 12 may also comprise a visualization circuit 33 that is connected to the analysis circuit 32. Further, the measurement instrument 12 may comprise an integrated display. Alternatively, the measurement instrument 12 may be connectable to a display.

In the embodiment shown in FIG. 1, the measurement system 10 comprises a calibrated noise source 34 that is connected to an input of the device under test 14. In general, the calibrated noise source 34 is configured to generate a noise signal having a known enhanced noise ratio, i.e. a noise level that is a known multiple of the thermal noise. For example, the calibrated noise source 34 may be a noise diode, wherein a predetermined voltage is applied to the noise diode.

Figure 2:
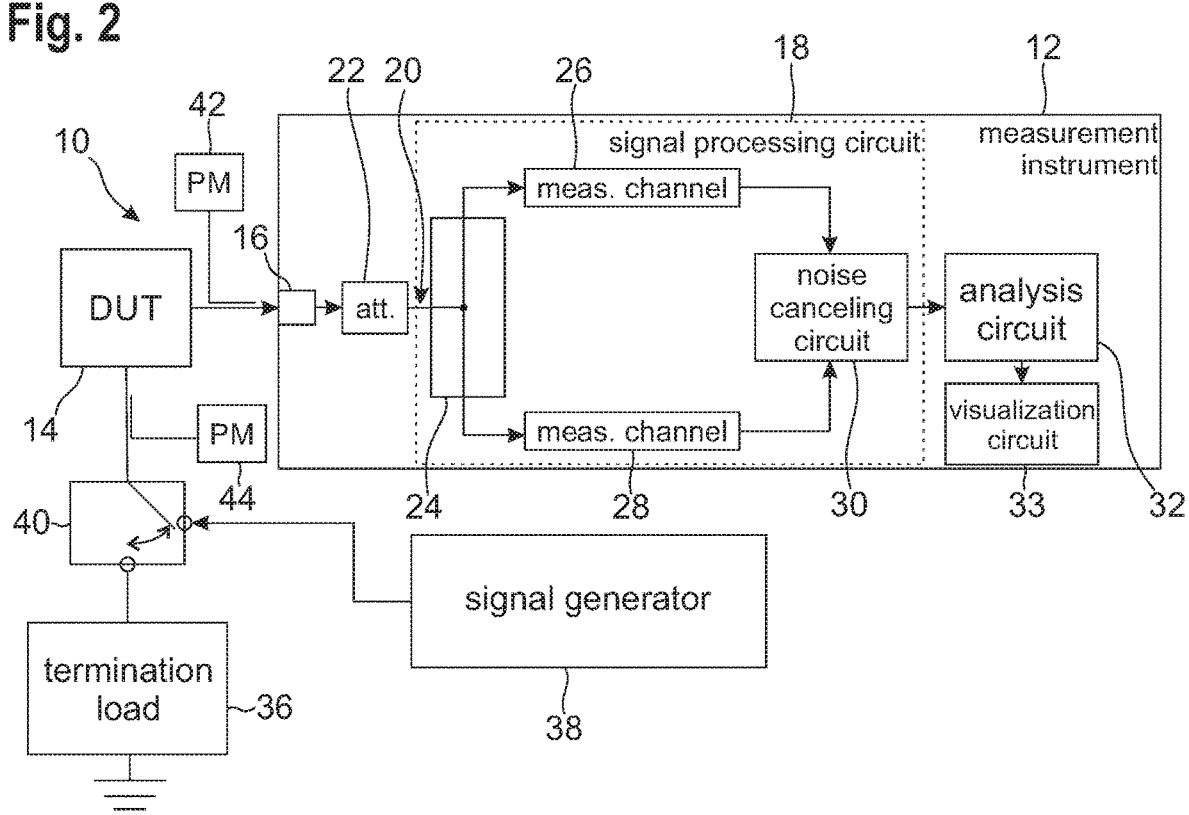
FIG. 2 schematically shows a measurement system according to another embodiment of the present disclosure.

FIG. 2 schematically shows another embodiment of the measurement system 10, wherein only the differences compared to the embodiment of FIG. 1 described above are explained in the following.

In the embodiment shown in FIG. 2, the measurement system 10 comprises a termination load 36 having a predefined impedance. For example, the termination load 36 has an impedance between 25 Ohm and 75 Ohm, for example 50 Ohm. Optionally, the measurement system 10 further comprises a signal generator 38 that is configured to generate and output a test signal. For example, the signal generator 38 may be an arbitrary waveform generator, such that the test signal can have an arbitrary shape.

Optionally, a switching circuit 40 is provided that is connected to both the termination load 36 and the signal generator 38. The switching circuit 40 is configured to selectively connect the termination load 36 or the signal generator 38 with the input of the device under test 14.

Between the output of the device under test 14 and the signal input 16, a first power meter 42 may be provided.

Further, a second power meter 44 may be provided between the switching circuit 40 and the input of the device under test 14.

Figure 3:
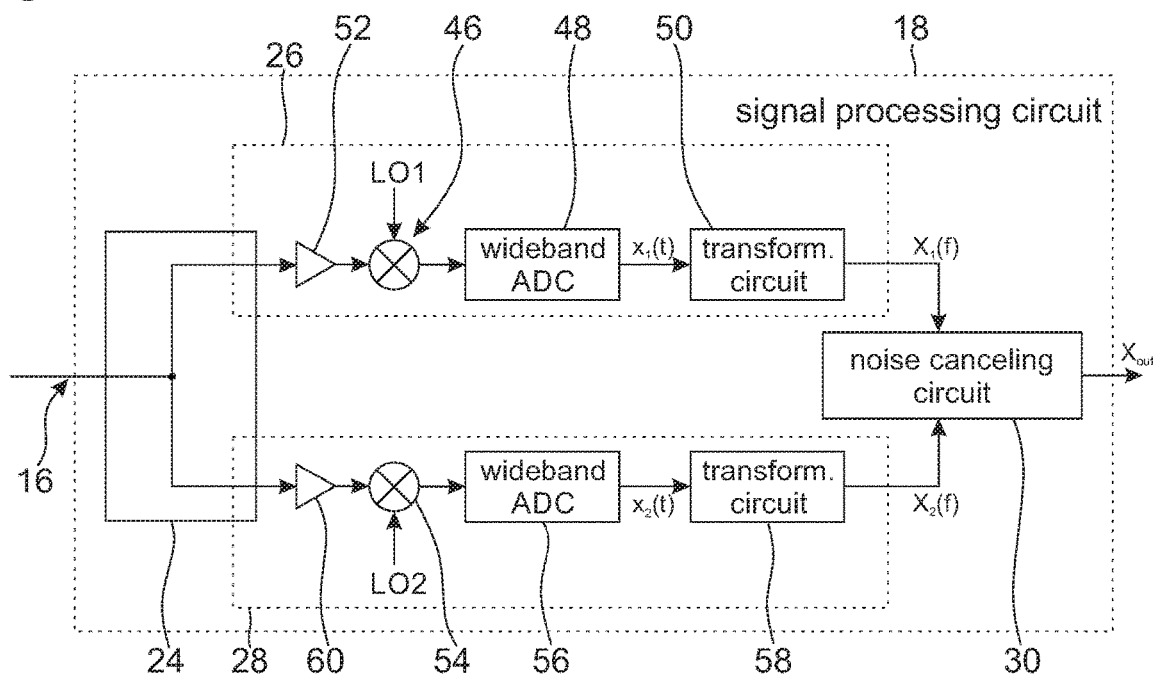
FIG. 3 schematically shows a signal processing circuit of the measurement system of FIG. 1 or FIG. 2 in more detail.

FIG. 3 shows the signal processing circuit 18 in more detail. It is noted that the signal processing circuit 18 may be configured identically in the different embodiments of the measurement system 10 described above.

As shown in FIG. 3, the first measurement channel 26 comprises a first mixer circuit 46 receiving a first local oscillator signal LO1. The first mixer circuit 46 is configured to down-convert the input signal processed by the first measurement channel 26 to an intermediate frequency being suitable for processing by the electronic components downstream of the first mixer circuit 46.

The first measurement channel 26 further comprises a first wideband ADC 48 that is provided downstream of the first mixer circuit 46. The first wideband ADC 48 is configured to digitize a signal processed by the first measurement channel 26, namely the down-converted signal, thereby obtaining a first digitized signal $x_1(t)$, wherein the first digitized signal $x_1(t)$ is a time-domain signal.

In some embodiments, the first wideband ADC 48 may have a bandwidth that is equal to or larger than 20 MHz, 50 MHz, 100 MHz, 150 MHz, 250 MHz, 500 MHz, 1 GHZ, 1.5 GHZ, 2.5 GHZ, 5 GHz, 10 GHz, 15 GHz, or 50 GHz.

The first measurement channel 26 further comprises a first transformation circuit 50 that is provided downstream of the first wideband ADC 48. The first transformation circuit 50 is configured to apply a fast Fourier transform (FFT) to the first digitized signal $x_1(t)$, thereby obtaining a first frequency domain signal $X_1(f)$. In some embodiments, the first frequency domain signal $X_1(f)$ is a complex-valued signal. The first transformation circuit 50 is connected with the noise canceling circuit 30, such that the first frequency domain signal $X_1(f)$ is forwarded to the noise canceling circuit 30.

Optionally, the first measurement channel 26 may comprise an amplifier 52 or any other suitable signal-shaping circuit(s) at suitable positions within the first measurement channel 26.

The second measurement channel 28 is functionally identical to the first measurement channel 26. In particular, the second measurement channel 28 may be synchronized with the first measurement channel 26.

In the embodiment shown, the second measurement channel 28 comprises a second mixer circuit 54 receiving a second local oscillator signal LO2 having the same frequency as the first local oscillator signal LO1. The second mixer circuit 54 is configured to down-convert the input signal processed by the second measurement channel 28 to an intermediate frequency, namely to the same intermediate frequency as in the first measurement channel 26.

The second measurement channel 28 further comprises a second wideband ADC 56 that is provided downstream of the second mixer circuit 54. The second wideband ADC 56 is configured to digitize a signal processed by the second measurement channel 28, namely the down-converted signal, thereby obtaining a second digitized signal $x_2(t)$, wherein the second digitized signal $x_2(t)$ is a time-domain signal. The second wideband ADC 56 has the same bandwidth as the first wideband ADC 48.

The second measurement channel 28 further comprises a second transformation circuit 58 that is provided downstream of the second wideband ADC 56. The second transformation circuit 58 is configured to apply a fast Fourier transform (FFT) to the second digitized signal $x_2(t)$, thereby obtaining a second frequency domain signal $X_2(f)$. The second frequency domain signal $X_2(f)$ is a complex-valued signal. The second transformation circuit 58 is connected with the noise canceling circuit 30, such that the second frequency domain signal $X_2(f)$ is forwarded to the noise canceling circuit 30.

Optionally, the second measurement channel 28 may comprise an amplifier 60 or any other suitable signal-shaping circuit(s) at suitable positions within the second measurement channel 28.

The noise canceling circuit 30 is configured to determine a combined average of the first frequency domain signal $X_1(f)$ and of the second frequency domain signal $X_2(f)$ over a predetermined number of frequency bins, thereby obtaining a complex-valued average signal.

In some embodiments, the noise canceling circuit 30 is configured to multiply the first frequency domain signal $X_1(f)$ with the complex conjugate of the second frequency domain signal $X_2(f)$, thereby obtaining a complex-valued multiplication signal X(f), i.e.

$$X(f) = X_1(f) \cdot X_2^*(f).$$

The noise canceling circuit 30 further is configured to average the complex-valued multiplication signal over a predetermined number of frequency bins N, thereby obtaining the complex-valued average signal. In some embodiments, the predetermined number N may be adjustable, e.g. via a user interface of the measurement instrument 12. Alternatively or additionally, the measurement instrument 12 may be configured to automatically adapt the predetermined number N.

As $X_1(f)$ and $X_2(f)$ are frequency domain signals, the complex-valued average signal corresponds to the trace of the cross-correlation matrix of the first frequency domain signal $X_1(f)$ and the second frequency domain signal $X_2(f)$, divided by the predetermined number of frequency bins N.

In some embodiments, the noise canceling circuit 30 further is configured to determine the absolute value of the complex-valued average signal or the real part of the complex-valued average signal, thereby obtaining an output signal $X_{out}$ of the signal processing circuit 18.

In the output signal $X_{out}$, noise originating in the measurement channels 26, 28 cancels at least partially, for example completely. This can be seen as follows. The frequency domain signals $X_1$, $X_2$ can be split into a correlated part from the device under test 14 ($\alpha$) and two uncorrelated noise parts ($n_1$ and $n_2$) from the measurement channels 26, 28:

$$X_1 = a + n_1$$
$$X_2 = a + n_2$$

The output signal $X_{out}$ of the signal processing circuit 18 is then given by $$X_{out} = \left| \frac{1}{N} \sum_{i=0}^{N-1} X_{1i} \cdot X_{2i}^* \right|$$
$$= \frac{1}{N} \cdot \left| \sum_{i=0}^{N-1} |a_i|^2 + a_i \cdot n_{2i}^* + a_i^* \cdot n_{1i} + n_{1i} \cdot n_{2i}^* \right|$$

It is noted that this is the result for the case of the absolute value being taken. The absolute value can be replaced by the real part.

The first term, i.e. $1/N \ \Sigma |\alpha_i|^2$, corresponds to the average power of the input signal received from the device under test 14.

The further terms correspond to multiplications of uncorrelated signals, and thus cancel at least partially. In some embodiments, the further terms correspond to noise originating in the measurement channels 26, 28.

In certain embodiments, it has turned out that these unwanted noise contributions are reduced approximately by $5 \cdot \log_{10}(N)$ dB or by $1/\sqrt{N}$, respectively.

In some embodiments, the output signal $X_{out}$ of the signal processing circuit 18 is forwarded to the analysis circuit 32. The analysis circuit 32 is configured to determine a noise figure of the device under test 14 based on the output signal $X_{out}$ of the signal processing circuit 18.

In the embodiment of the measurement system 10 shown in FIG. 1, the noise figure of the device under test 14 may be determined via a Y-factor method. For example, the output signal $X_{out}$ of the signal processing circuit 18 is determined two times as described above, namely once with the calibrated noise source 34 being activated and once with the calibrated noise source 34 being deactivated. The noise figure of the device under test 14 is then determined based on the output signals $X_{out}$ determined in the two iterations.

In some embodiments, the noise figure NF of the device under test 14 can be determined according to $$NF = ENR - 10 \log(10^{Y/10} - 1),$$

wherein ENR is the enhanced noise ratio of the calibrated noise source 34.

Further, the Y-factor Y is the difference between a first measured power $P_{on}$ with the calibrated noise source 34 being activated and a second measured power $P_{off}$ with the calibrated noise source 34 being deactivated, i.e. $Y = P_{on} - P_{off}$.

The enhanced noise ratio ENR, the first measured power $P_{on}$, and the second measured power $P_{off}$ are related to the gain G of the device under test 14 according to $$G = 10 \log(10^{P_{on}/10} - 10^{P_{off}/10}) - ENR - 10 \log(k \cdot B \cdot T).$$

Therein, k is Boltzmann's constant, B is the resolution bandwidth defined by the FFT window, and T is the temperature.

In the embodiment of the measurement system 10 shown in FIG. 2, the noise figure of the device under test 14 may be determined via a cold-source method. In an optional calibration step, the signal generator 38 may be connected to the input of the device under test 14 via the switching circuit 40. The signal generator 38 generates a predefined test signal, which is processed by the device under test 14. The power of the output signal of the device under test 14 is measured by the first power meter 42.

In order to enhance the accuracy of the measurements, the power of the predefined test signal may be measured upstream of the device under test 14 by the second power meter 44.

The gain of the device under test 14 is then determined based on the measured power of the output signal and, optionally, based on the measured power of the predefined test signal.

After the calibration step, the termination load 36 is connected to the device under test 14 via the switching circuit 40, and the output signal $X_{out}$ is determined as described above with the termination load 36 applied to the input of the device under test 14.

The noise figure of the device under test 14 is then determined based on the output signal $X_{out}$ and based on the determined gain of the device under test 14.

Visualization data associated with the complex-valued average signal, for example visualization data of the determined noise figure of the device under test 14, may be determined by the visualization circuit 33. The visualization data may be displayed on a display being integrated into the measurement instrument 12 and/or on a display being connected to the measurement instrument 12.

Certain embodiments disclosed herein include instruments, apparatus, modules, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances where the components are distributed, the components are accessible to each other via communication links.

In some embodiments, one or more of the components referenced above, such as the signal processing circuit 18, or any component thereof, include circuitry programmed to carry out one or more steps of any of the methods disclosed herein. In some embodiments, one or more computer-readable media associated with or accessible by such circuitry contains computer readable instructions embodied thereon that, when executed by such circuitry, cause the component or circuitry to perform one or more steps of any of the methods disclosed herein.

In some embodiments, the computer readable instructions includes applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

In some embodiments, computer-readable media is any medium that stores computer readable instructions, or other information non-transitorily and is directly or indirectly accessible to a computing device, such as processor circuitry, etc., or other circuitry disclosed herein etc. In other words, a computer-readable medium is a non-transitory memory at which one or more computing devices can access instructions, codes, data, or other information. As a non-limiting example, a computer-readable medium may include a volatile random access memory (RAM), a persistent data store such as a hard disk drive or a solid-state drive, or a combination thereof. In some embodiments, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein. All such combinations or sub-combinations of features are within the scope of the present disclosure.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A signal processing circuit for a measurement instrument, the signal processing circuit comprising:
   a measurement input;
   a first measurement channel that comprises a first wideband analog-to-digital converter (ADC) and a first transformation circuit, wherein the first wideband ADC is configured to digitize a signal processed by the first measurement channel, thereby obtaining a first digitized signal, wherein the first transformation circuit is configured to transform the first digitized signal or a processed version of the first digitized signal into frequency domain such that an output signal of the first measurement channel is a first frequency domain signal;
   a second measurement channel that comprises a second wideband ADC and a second transformation circuit, wherein the second wideband ADC is configured to digitize a signal processed by the second measurement channel, thereby obtaining a second digitized signal, wherein the second transformation circuit is configured to transform the second digitized signal or a processed version of the second digitized signal into frequency domain such that an output signal of the second measurement channel is a second frequency domain signal; and a noise canceling circuit, wherein the first measurement channel and the second measurement channels are arranged in parallel and are each connected to the measurement input such that an input signal received via the measurement input is forwarded to the first measurement channel and to the second measurement channel, respectively, wherein the first frequency domain signal and the second frequency domain signal are a complex-valued signal, respectively, wherein the noise canceling circuit is configured to receive the first frequency domain signal and the second frequency domain signal and to determine a combined average of the first frequency domain signal and of the second frequency domain signal over a predetermined number of frequency bins, thereby obtaining a complex-valued average signal.

2. The signal processing circuit of claim 1, wherein the noise canceling circuit is configured to determine an absolute value of the complex-valued average signal, thereby obtaining an output signal.

3. The signal processing circuit of claim 1, wherein the noise canceling circuit is configured to determine a real part of the complex-valued average signal, thereby obtaining an output signal.

4. The signal processing circuit of claim 1, wherein the predetermined number of frequency bins is adjustable.

5. The signal processing circuit of claim 1, wherein the first measurement channel and the second measurement channel are functionally identical.

6. The signal processing circuit of claim 1, wherein the first measurement channel and the second measurement channel are synchronized.

7. The signal processing circuit of claim 1, further comprising a visualization circuit, wherein the visualization circuit is configured to generate visualization data associated with the complex-valued average signal.

8. The signal processing circuit of claim 1, wherein the first transformation circuit and the second transformation circuit are each configured to perform a fast Fourier transform.

9. The signal processing circuit of claim 1, wherein the first measurement channel comprises a first mixer circuit receiving a first local oscillator signal, wherein the second measurement channel comprises a second mixer circuit receiving a second local oscillator signal, and wherein the first local oscillator signal and the second local oscillator signal have the same frequency.

10. A measurement system, comprising:
a signal processing circuit according to claim 1;
a device under test; and
an analysis circuit,
wherein an output of the device under test is connected to the measurement input of the signal processing circuit, and
wherein the analysis circuit is configured to determine a noise figure of the device under test based on an output signal of the signal processing circuit.

11. The measurement system of claim 10, further comprising a calibrated noise source, wherein the calibrated noise source is connected to an input of the device under test.

12. The measurement system of claim 11, wherein the measurement system is configured to determine the noise figure of the device under test by a Y-factor technique.

13. The measurement system of claim 10, further comprising a termination load, wherein the termination load is connected to an input of the device under test.

14. The measurement system of claim 13, wherein the measurement system is configured to determine the noise figure of the device under test by a cold-source technique.

15. The measurement system of claim 14, wherein the measurement system further comprises a power meter that is provided downstream of the device under test and upstream of the measurement input.

16. The measurement system of claim 10, wherein the signal processing circuit and the analysis circuit are integrated into a measurement instrument.

17. The measurement system of claim 16, wherein the measurement instrument is a signal analyzer, a spectrum analyzer, a noise figure meter, a vector network analyzer, or an oscilloscope.

* * * * *